United States Patent
Suchy et al.

(10) Patent No.: US 10,234,549 B2
(45) Date of Patent: Mar. 19, 2019

(54) CIRCUIT FOR ACOUSTIC DISTANCE TIME OF FLIGHT COMPENSATION

(71) Applicant: SEMICONDUCTOR COMPONENTS INDUSTRIES, LLC, Phoenix, AZ (US)

(72) Inventors: Tomas Suchy, Brno (CZ); Marek Hustava, Bratislava (SK)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 121 days.

(21) Appl. No.: 15/286,822

(22) Filed: Oct. 6, 2016

(65) Prior Publication Data

US 2017/0261606 A1    Sep. 14, 2017

Related U.S. Application Data

(60) Provisional application No. 62/305,312, filed on Mar. 8, 2016.

(51) Int. Cl.
  *G01S 7/00* (2006.01)
  *G01S 7/527* (2006.01)
  (Continued)

(52) U.S. Cl.
  CPC .............. *G01S 7/527* (2013.01); *G01S 7/521* (2013.01); *G01S 7/52004* (2013.01);
  (Continued)

(58) Field of Classification Search
  CPC .......... G01S 7/527; G01S 7/521; G01S 15/10; G01S 15/931; G01S 7/536; G01S 7/52004; G01S 2015/938; G01S 15/876
  See application file for complete search history.

(56) References Cited

U.S. PATENT DOCUMENTS

| 5,793,704 A | 8/1998 | Freger |
| 6,205,087 B1 * | 3/2001 | Fukuhara ................. G01V 1/48 367/30 |

(Continued)

OTHER PUBLICATIONS

Sarabia, Esther, Jose Llata, Sandra Robla, Carlos Torre, and Juan Oria. "Accurate Estimation of Airborne Ultrasonic Time-of-Flight for Overlapping Echoes." Sensors 13.11 (2013): 15465-5488.

(Continued)

*Primary Examiner* — Hovhannes Baghdasaryan
(74) *Attorney, Agent, or Firm* — Polansky & Associates, P.L.L.C.; Paul J. Polansky; Rosalynn M. Smith

(57) ABSTRACT

In one form, an acoustic signal is generated for an acoustic transducer, where the acoustic transducer transmits the acoustic signal to determine a first position of an obstacle. In response to the acoustic signal encountering the obstacle within a predetermined distance, an echo, or pulse, is detected at the acoustic transducer. At a first time, a magnitude is detected in response to a rising edge of the pulse intersecting a determined threshold. A second magnitude is detected in response to the detection of a first peak of the pulse. A time of flight of the acoustic signal, within the predetermined distance, is determined when a compensation time is extracted from a correction calculation algorithm in response to detecting the first magnitude and the second magnitude. The compensation time is subtracted from the first time, and the difference of the compensation time and the first time is the time of flight.

22 Claims, 7 Drawing Sheets

(51) Int. Cl.
G01S 7/521 (2006.01)
G01S 15/10 (2006.01)
G01S 15/93 (2006.01)
G01S 7/52 (2006.01)
G01S 7/536 (2006.01)
G01S 15/87 (2006.01)

(52) U.S. Cl.
CPC .............. *G01S 7/536* (2013.01); *G01S 15/10* (2013.01); *G01S 15/931* (2013.01); *G01S 15/876* (2013.01); *G01S 2015/938* (2013.01)

(56) References Cited

U.S. PATENT DOCUMENTS

| | | |
|---|---|---|
| 7,656,750 B2 | 2/2010 | Koudar |
| 2006/0247526 A1* | 11/2006 | Lee ........................ G01S 15/102 600/438 |
| 2007/0121097 A1* | 5/2007 | Boillot .................. G01S 15/104 356/28 |
| 2012/0176864 A1* | 7/2012 | Karl ........................ G01S 7/539 367/89 |
| 2013/0235700 A1* | 9/2013 | Koudar ................... G01S 15/08 367/99 |

OTHER PUBLICATIONS

L. Svilainis, "Review of high resolution time of flight estimation techniques for ultrasonic signals," in NDT 2013 Conference & Database Exhibition: The British Institute of Non-Destructive Testing, Sep. 2012, pp. 1-12.

Vemuri, Arun T. "Using a fixed threshold in ultrasonic distance-ranging automotive applications." Analog Applications (2012).

* cited by examiner

CIRCUIT FOR ACOUSTIC DISTANCE TIME OF FLIGHT COMPENSATION

FIELD OF THE DISCLOSURE

The present disclosure relates generally to electrical and electronic circuits, and more particularly to acoustic distance measuring systems.

BACKGROUND

Acoustic measuring systems and distance measuring systems are utilized in a variety of applications. For example, acoustic measuring systems are utilized to measure obstacle distance in applications ranging from automotive systems to fossil discovery. Acoustic measuring systems generally operate by first transmitting a pulse of acoustic energy, creating a sound wave. Then a measurement of the time of flight of the sound wave is recorded. The time of flight, which is the time from transmission of the sound wave until a reflection of the sound wave is received, determines the distance of the obstacle. Automotive applications that utilize acoustic measuring systems require reliable detection of the presence of an obstacle. Currently, the reliable detection of obstacles may be opposed by the complex shape of obstacles, as well as environmental and electrical noise causing false obstacle detection.

Acoustic measuring systems often utilize acoustic transducers both to transmit the generated sound wave, and to receive the reflected signal, or echo signal. A standard approach to measuring the distance of an obstacle is to report the time of flight of an object once the echo signal crosses a threshold. However, dependence on the time when an echo signal crosses a threshold is not reliable. Reliability of this method may vary with the fluctuation of the envelope shape of the echo signal. Additionally, as the threshold varies, the time of flight reported for the same obstacle at a same distance will also vary. Accuracy of acoustic measuring systems is important. Errored object detection could be detrimental in automotive and other acoustic measuring applications. Therefore, avoiding skewed object detection related to an error in an object's shape, an object's height, or due to the detection system's threshold configuration is important. Accuracy in time of flight calculations insures proper acoustic measuring system functionality and related reliability.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

For simplicity and clarity of the illustration, elements in the figures are not necessarily to scale, are only schematic, and are non-limiting. Additionally, descriptions and details of well-known steps and elements are omitted for simplicity of the description. It will be appreciated by those skilled in the art that the words "during", "while", and "when" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art there may be minor variances that may prevent the values or positions from being exactly as stated.

Figure 1:
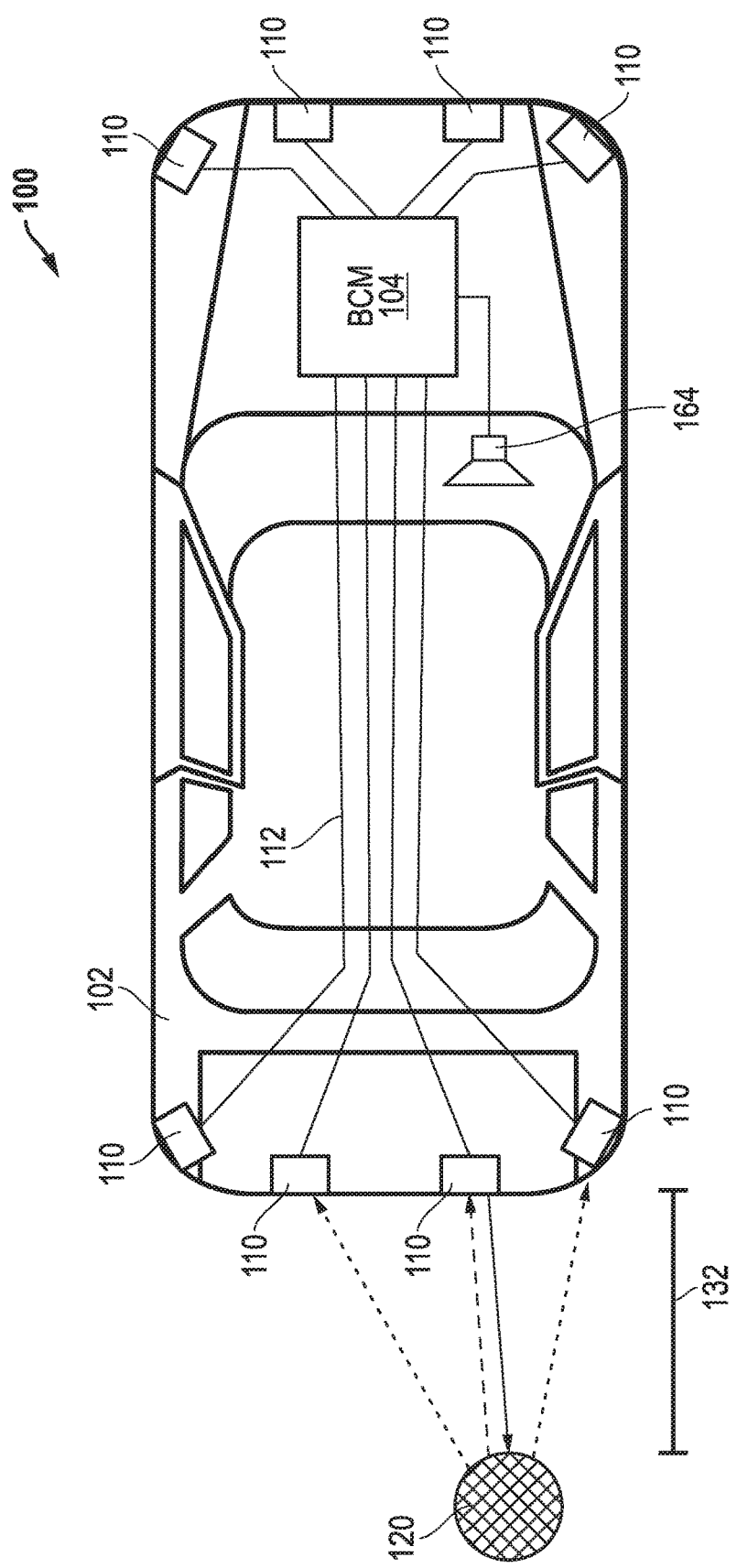
FIG. 1 illustrates in block diagram form an acoustic distance measuring system according to one embodiment.

FIG. 1 illustrates in block diagram form an acoustic distance measuring system 100 according to one embodiment. Acoustic distance measuring system 100 in FIG. 1 includes an automotive device 102, a body controller module (BCM) 104, a loudspeaker 164, a set of transmission lines 112, a set of sensors 110, and an obstacle 120. A system controller, such as BCM 104, is situated on or within automotive device 102, and provides an electrical signal corresponding to an audible output to loudspeaker 164.

Automotive device 102 is communicatively connected to BCM 104. BCM 104 has an output for connecting to one or more acoustic transducers, such as sensors 110. BCM 104 has an input also connected to each of sensors 110. Additionally, BCM 104 has an output for providing an output signal to loudspeaker 164. In one embodiment, sensors 110 is an ultrasonic sensor that emits an ultrasonic pulse, or acoustic signal as described herein, that reflects off of obstacle 120 when obstacle 120 is within the wave filed of the acoustic signal. The acoustic signal is generally emitted above frequencies of audible sound. The reflected pulse signal, or echo, is received by sensor 110. Detection of the echo generates an output signal for use by BCM 104. Each of sensors 110 is capable of creating an acoustic signal, and sensing a reflected pulse signal, or echo, when obstacle 120 is encountered.

In the illustrated embodiment, BCM 104 operates as a controller for an acoustic distance measuring system 100, generating an acoustic signal for sensors 110 at a first time. Sensors 110 are susceptible to receiving echo signals when a transmitted acoustic signal encounters an obstacle. The received echo signals are utilized to define a detectable distance 132. BCM 104 transmits signals to sensors 110, via transmission lines 112, and responsively, sensors 110 output the acoustic signals. The acoustic signal generated by each sensor 110 travels away from sensor 110 and propagates through air. When BCM 104 stops transmission of the acoustic signal, BCM 104 monitors sensors 110 for echo signals that may be caused by interruptions to the propagating acoustic signal. When obstacle 120 is detected, an echo is received at one of sensors 110. The received echo signal is processed by sensor 110 to determine a corrected time of flight in which the acoustic signal encounters obstacle 120. The corrected time of flight is transmitted to BCM 104, via transmission lines 112. BCM 104 reports detection of object 120 with respect to the surface of object 120 that is closest to sensor 110. Reliable detection for obstacles of varying shapes, height, and obscure dimensions, is needed. Additionally, avoiding false obstacle detection due to varying thresholds during severe noise conditions is a desirable characteristic. Acoustic distance measuring system 100 compensates for these problems as described further.

Figure 2:
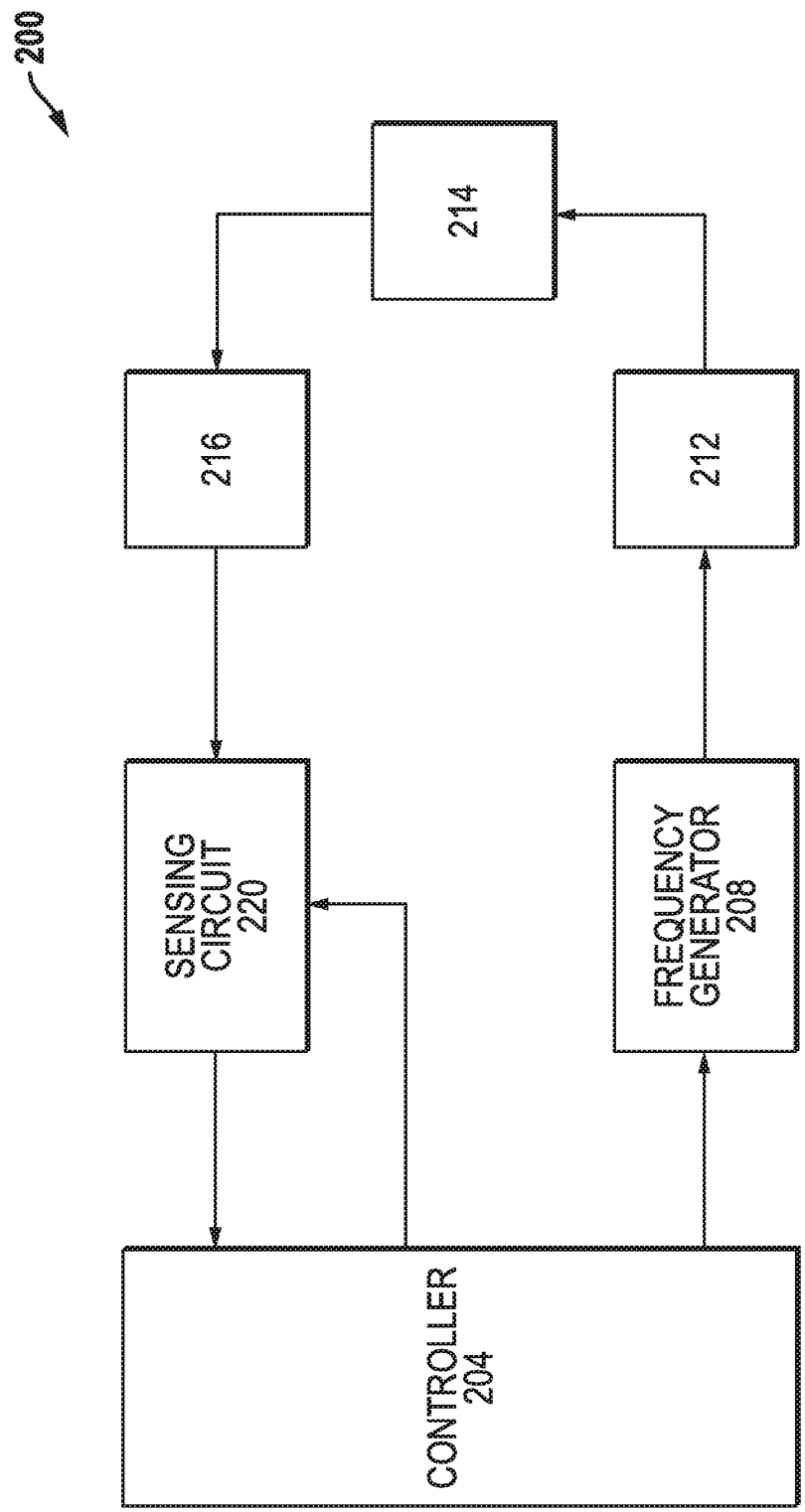
FIG. 2 illustrates in block diagram form an acoustic distance measuring circuit for use in the acoustic distance measuring system of FIG. 1.

FIG. 2 illustrates in block diagram form an acoustic distance measuring circuit 200 for use in the acoustic distance measuring system of FIG. 1. Acoustic distance measuring circuit 200 includes a controller 204, a frequency generator 208, a transmitter amplifier 212, an acoustic transducer 214, a receiver amplifier 216, and sensing circuit 220.

Controller 204 is connected to frequency generator 208. A control signal is output to frequency generator 208 from controller 204. Additionally, controller 204 has at least one output terminal for outputting a determined threshold. Controller 204 has an input terminal for receiving a signal for the corrected time of flight. Controller 204 may be, for example, a BCM, an electronic control unit, or a control system that operates the acoustic distance measuring system of FIG. 1. Controller 204 operates the acoustic distance measuring system of FIG. 1 by outputting the control signal to frequency generator 208, as well as by receiving the corrected time of flight signal processed when sensing circuit 220 receives echo signals at acoustic transducer 214.

Frequency generator 208 has an input terminal for receiving the control signal, and an output terminal, connected to transmitter amplifier 212. Frequency generator 208 generates an electrical signal, which is transmitted to transducer 214 via transmitter amplifier 212.

Transmitter amplifier 212 has an input for receiving the electrical signal from frequency generator 208. The output of transmitter amplifier 212, connected to acoustic transducer 214, is for providing an amplified electrical signal to acoustic transducer 214.

Acoustic transducer 214 has an input terminal for receiving the amplified electrical signal. Additionally, acoustic transducer 214 has an output terminal adapted to transmit a generated pulse signal, or acoustic signal. Acoustic transducer 214 may be, for example, a piezoelectric sensor.

Receiver amplifier 216 has an input for connecting to acoustic transducer 214 and an output. The output of receiver amplifier 216, connected to sensing circuit 220, transmits the received pulse signal.

Sensing circuit 220 has an input connected to the output of receiver amplifier 216, an input for receiving a threshold, and an output for providing the corrected time of flight measurement in response to detection of the threshold. The threshold is a time varying signal, configured by controller 204. The threshold is configured according to the dimensional position of acoustic transducer 214, and in response to a measured effect of the background noise detected by acoustic transducer 214 to avoid false detection of obstacles. The determined threshold is utilized by sensing circuit 220 for defining a minimal magnitude for a received pulse to cross, above a noise level, in order to detect an obstacle in response to the transmission of the acoustic signal from the acoustic transducer. Sensing circuit 220 reports the beginning of the echo, or pulse signal, as the time of flight, where the beginning of the pulse signal indicates the closest obstacle surface to acoustic transducer 214.

In operation, controller 204 provides the control signal to frequency generator 208. Frequency generator 208 generates a signal and provides the generated signal to transmitter amplifier 212 as an electrical signal, at a first time. Transmitter amplifier 212 amplifies the power of the signal generated by frequency generator 208 and provides the electrical signal to acoustic transducer 214. When transmitter amplifier 212 is not implemented, frequency generator 208 provides the un-amplified signal to acoustic transducer 214. Acoustic transducer 214 vibrates and generates a signal that corresponds to the input signal provided. The acoustic signal generated by acoustic transducer 214 vibrates and travels away from acoustic transducer 214. Receiver amplifier 216 monitors acoustic transducer 214 for echo signals, amplifies received echo signals, and then transmits the pulse signal to sensing circuit 220. Sensing circuit 220 utilizes the received pulse signal in addition to the input of the threshold to determine the corrected time of flight of the acoustic signal. The corrected time of flight is reported to controller 204.

Figure 3:
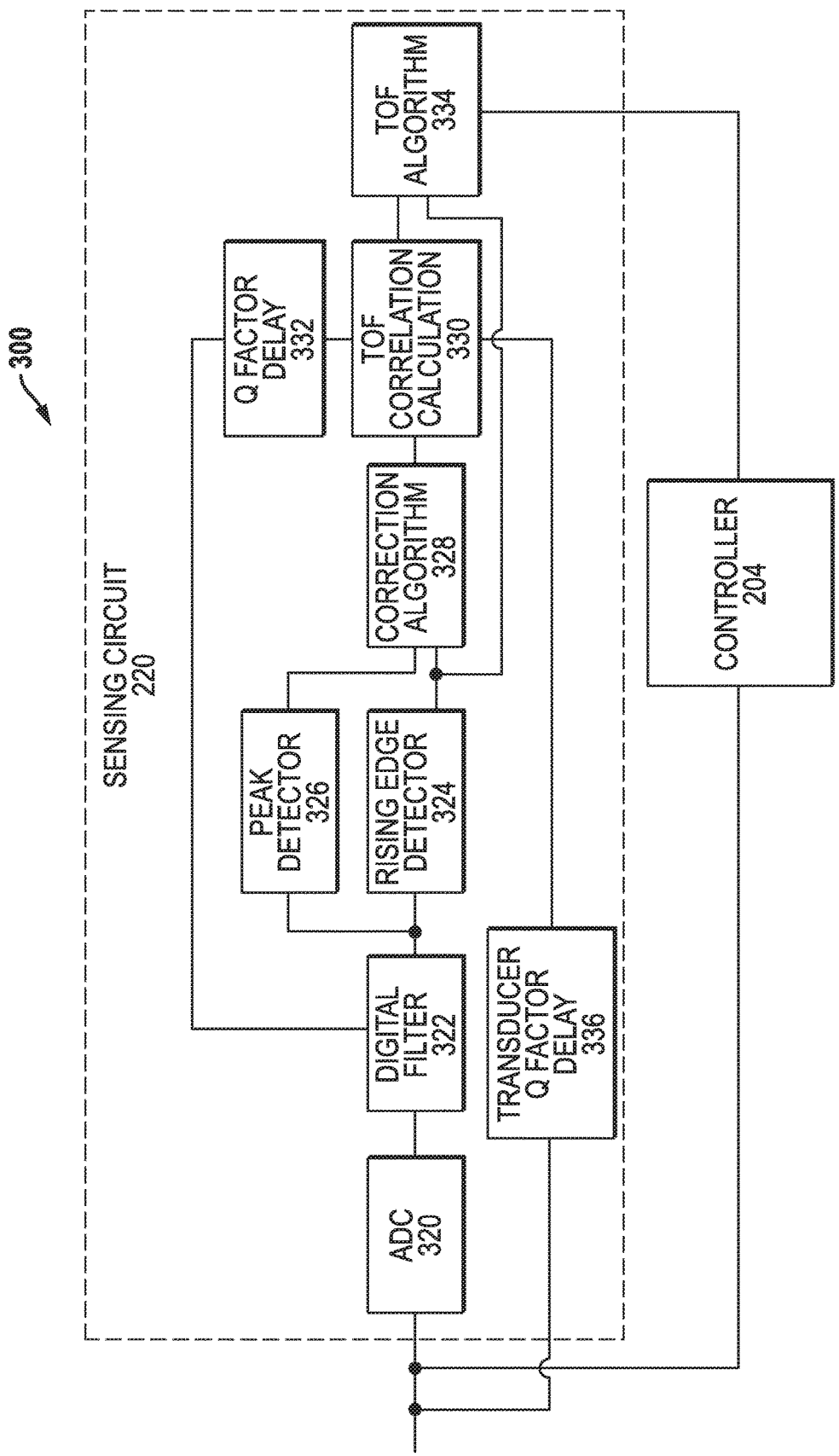
FIG. 3 illustrates in block diagram form the sensing circuit of FIG. 2.

FIG. 3 illustrates in block diagram form a sensing circuit 300 that can be used as sensing circuit 220 of FIG. 2. Sensing circuit 300 includes generally a controller 204, an analog to digital convertor 320, a digital filter 322, a rising edge detector 324, a peak detector 326, a correction algorithm module 328, a time of flight correction calculation module 330, a quality (Q) factor delay value block 332, a time of flight algorithm module 334, and a transducer quality (Q) factor delay value block 336.

Analog-to-digital converter 320 has an input connected to the output of a receiver amplifier (for example, receiver amplifier 216 of FIG. 2) for receiving an input signal, and an output. Digital filter 322 has an input connected to the output of analog to digital converter 320, and an output for providing a Q factor time delay value at Q factor delay value block 332, and an output for providing a filtered signal.

Rising edge detector 324 has an input coupled to the output of digital filter 322, and an output for providing a first magnitude and a first time of when a rising edge of the pulse signal received from digital filter 322 intersects the threshold.

Peak detector 326 has an input coupled to the output of digital filter 322, and an output for providing a magnitude of the pulse signal received from digital filter 322 at a peak time. The magnitude of the pulse signal is received in response to detecting an obstacle within a predefined distance relative to the acoustic transducer according to the filtered pulse signal.

Correction algorithm module 328 has an input coupled to the rising edge detector and the peak detector, and an output for providing a correction ratio. The correction ratio is a ratio of the first magnitude of when a rising edge of the magnitude of the pulse received from the receiver amplifier intersects the threshold, at a first time, and the magnitude of the pulse received from the acoustic transducer at the peak time.

Time of flight correction calculation module 330 has an input coupled to the output of the correction algorithm module 328, an input for receiving the output of digital filter Q factor time delay value block 332, an input for receiving the output of acoustic transducer Q factor time delay value block 336, and an output for providing a compensation time for calculating a corrected time of flight of an acoustic signal in response to encountering the obstacle, at a first position, within the predefined distance relative to the acoustic transducer, according to the filtered signal.

Time of flight module 334 has an input coupled to an output of peak detector 326, an input coupled to the output of time of flight correction calculation module 330, and an output for providing the corrected time of flight of an acoustic signal in response to the acoustic signal encountering the obstacle.

In operation, sensing circuit 300 receives an input signal, where the input signal includes the pulse received from receiver amplifier 216 (of FIG. 2) resulting from echo signals provided by acoustic transducer 214 (of FIG. 2) produced by reflections off physical objects. Sensing circuit 300 filters the signal received from acoustic transducer 214, and provides an output corresponding to the corrected time of flight of the acoustic signals with respect to the acoustic signal transmitted via acoustic transducer 214. Controller 204 transmits the configured threshold to the sensing circuit. Analog-to-digital convertor 320 digitizes the input signal received. Digital filter 322 receives the digitized input signal and provides the filtered pulse signal to rising edge detector 324 and peak detector 326. The rising edge of the filtered pulse signal is detected by rising edge detector 324 at a point where the rising edge intersects the threshold. In response to detecting the rising edge of the pulse, the time that the rising edge intersects the threshold and the magnitude that the rising edge meets the threshold are stored for use in calculating the corrected time of flight. Peak detector 326 detects the peak magnitude of the filtered pulse signal. In response to detecting the peak magnitude of the pulse, peak detector 326 stores the peak magnitude as the second magnitude for use in determining the corrected time of flight. Peak detection is performed subsequent to the filtered pulse signal passing the threshold a first time, and is valid while the filtered pulse signal is above the threshold.

Further, subsequent to detecting the magnitude when the rising edge intersects the threshold (first magnitude) and the peak magnitude (second magnitude) of the filtered signal, the first and second detected magnitudes are utilized in calculating the corrected time of flight. A ratio of the first magnitude and the second magnitude is determined by correction algorithm module 328. The ratio of the first magnitude and the second magnitude is multiplied by a factor of one hundred. The value of the determined ratio is utilized at time of flight correction calculation module 330. At time of flight correction calculation module 330, a correction look up table or a correction algorithm is utilized to further determine a compensation time. The compensation time is the amount of time utilized to adjust the originally detected time of flight. The adjustment, utilizing the compensation time, determines the corrected start of the pulse in response to when the acoustic signal encounters the obstacle.

Additionally, to timely transmit the corrected time of flight to controller 204 in response to when the acoustic signal encounters the obstacle, at least one of Q factor delay 332 and transducer Q factor delay 336 are factored into the calculation at time of flight correction calculation 330. Time of flight algorithm module 334 provides the corrected time of flight to controller 204 when the compensation time, provided by the output of time of flight correction calculation module 330, is subtracted from the first time of when the rising edge of the magnitude of the pulse received from the receiver amplifier intersects the threshold, as determined at rising edge detector 324.

In one embodiment, the Q factor time delay of digital filter 322 and transducer 214 determine a maximum time to receive transmission of a pulse measurement before a time of flight measurement is provided to controller 204. Digital filter quality factor time delay 332 determines the time delay need for sensing circuit 300 to provide the corrected time of flight to controller 204 with accurate timing. The value of digital filter Q factor time delay 332 is dynamically selected when the first magnitude of the pulse is detected at rising edge detector 324. As an increase in digital filter Q factor time delay 332 is detected, a response time of digital filter 322 automatically increases. However, in response to detection of a value for digital filter Q factor time delay 332 that is below a predetermined Q factor time delay value, transducer Q factor time delay 336 is dynamically input when the magnitude of the pulse is detected. Integrating the dynamically determined fixed delay into the time of flight correction algorithm enables a sensing circuit to properly compensate for the time needed to transmit the corrected time of flight to controller 204, thereby enabling increased accuracy of obstacle detection while maintaining an accurate, real-time reporting, of the corrected time of flight.

In another embodiment, digital filter Q factor is fixed when transducer 214 receives the echo pulse signal. A digital filter Q factor is selected to improve performance of sensing circuit 300. For example, the digital filter Q factor is a predetermined Q factor in the range of Q5 to Q20. A high value for digital filter 322 enables digital filter 322 to achieve a high signal to noise ratio, or increased noise suppression. However, Doppler performance of digital filter 322 is less than optimal when a high Q factor value is selected. When a low value for the digital filter Q factor is selected, Doppler performance of sensing circuit 200 is better; however, the signal to noise ratio is low, enabling less noise to be suppressed. The pulse rise time is dependent on the selected Q factor of digital filter 322; therefore, digital filter Q factor time delay 332 is a factor in reporting the corrected time of flight of the acoustic signal to controller 204. For example, for a quality factor value of Q5 for digital filter 322, the time for pulse signal to rise from 50% to 100% is half the time it takes for the pulse signal to rise from 50% to 100% in the case of a Q10 quality factor value. For low Q digital filter settings transducer Q factor time delay 336 is utilized to determine the corrected time of flight. In one embodiment, the value for the digital filter Q factor is a predetermined Q factor value. The digital filter Q factor is selected prior to the onset of a measurement, and remains the same Q factor for the duration of the measurement. In another embodiment, at least one of a low Q factor and a high Q factor is selected to correspond to a predefined measurement distance. In one example, the reflections received from an obstacle at a close distance (for example less than 2.4 meters), benefits from an improved signal to noise ratio; therefore, a higher (or increased) Q factor is applied.

Figure 4:
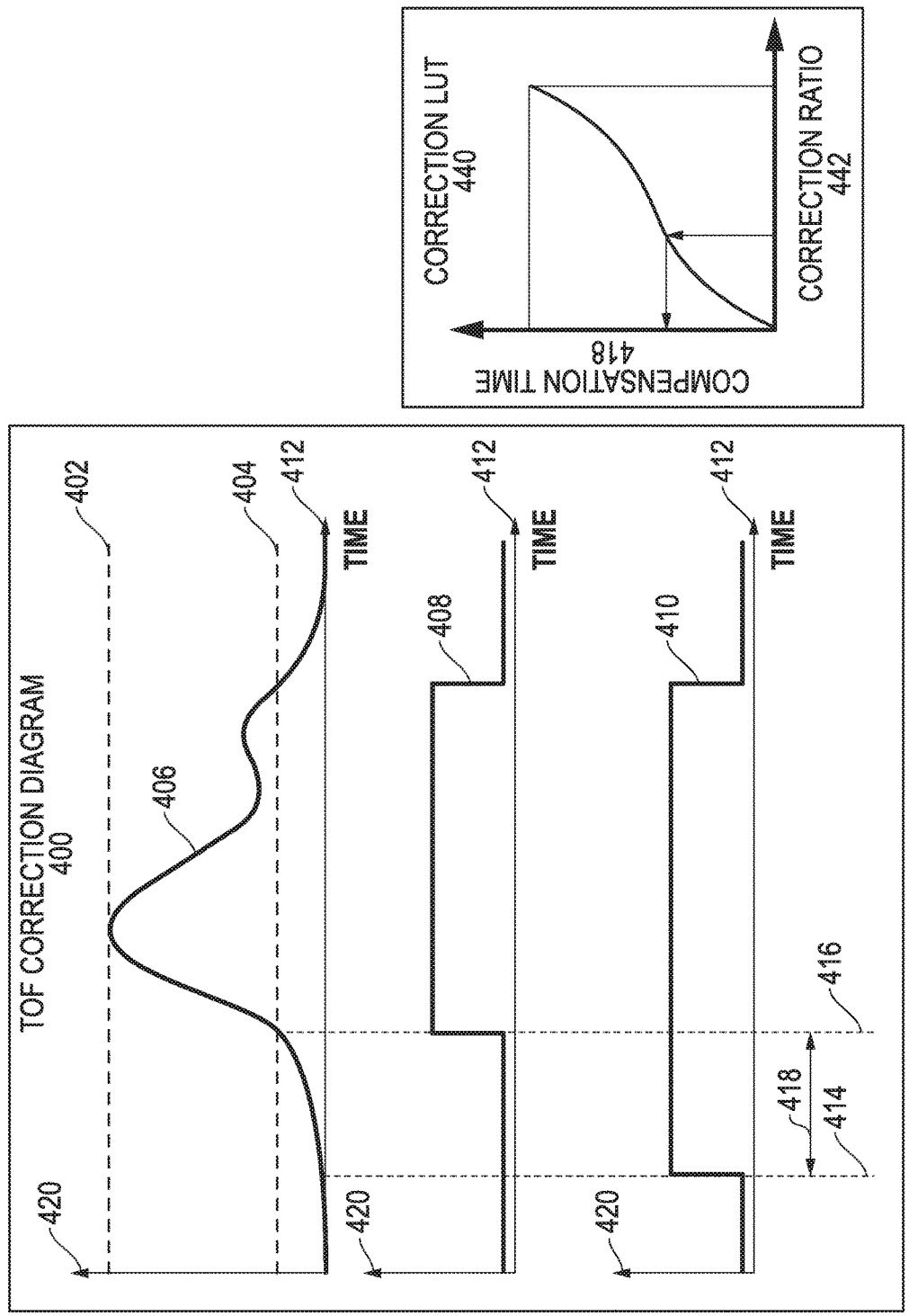
FIG. 4 illustrates a timing diagram depicting acoustic signals received by the acoustic distance measuring system according to an embodiment.

FIG. 4 illustrates a time of flight correction diagram 400, depicting a filtered pulse signal received by sensing circuit 300 of FIG. 3, and an exemplary correction look up table 440. Within time of flight correction diagram 400, time is represented on a time axis 412 and the vertical axis represents the magnitude of various signals in volts. Additionally, time of flight diagram 400 includes a pulse measurement waveform 406, a threshold magnitude 404, a peak magnitude 402, a waveform 408 illustrating an echo comparison signal, a waveform 410 illustrating a corrected echo comparison signal, compensation time 418, time of flight measurement 414, and rising edge time 416. Example correction look up table 440 includes compensation time 418, and correction ratio 442.

Time of flight correction diagram 400 shows a correction applied to filtered pulse 406. Rising edge detector 324 detects when pulse measurement 406 intersects threshold magnitude 404, and the magnitude at the intersecting point is recorded as the first magnitude. A second magnitude, peak magnitude 402, detected by peak detector 326 is recorded as the highest peak of pulse measurement 406 before the pulse signal intersects threshold 404 a second time. Subsequent to receiving threshold magnitude 404 and peak magnitude 402, correction algorithm 328 determines the value of correction ratio 442. Correction ratio 442 is utilized to determine compensation time 418 via selecting the value of correction ratio 442 on a graphical plot with a finite selection of points, and then determine compensation time 418, according to the values associated with example correction look up table 440. Time of flight correction calculation 330 determines compensation time 418. Although an example look up table is utilized in this illustration, an algorithm can be utilized without the use of a look up table to determine compensation time 418. Further, the corrected time of flight, time of flight measurement 414, is calculated by subtracting compensation time 418 from rising edge time 416, as provided at time of flight algorithm 334. The corrected time of flight is reported to controller 204. Waveform 408 and waveform 410 within time of flight correction diagram 400 illustrate the vast adjustment time associated with calculating the corrected time of flight when pulse measurement 406 is received.

Figure 5:
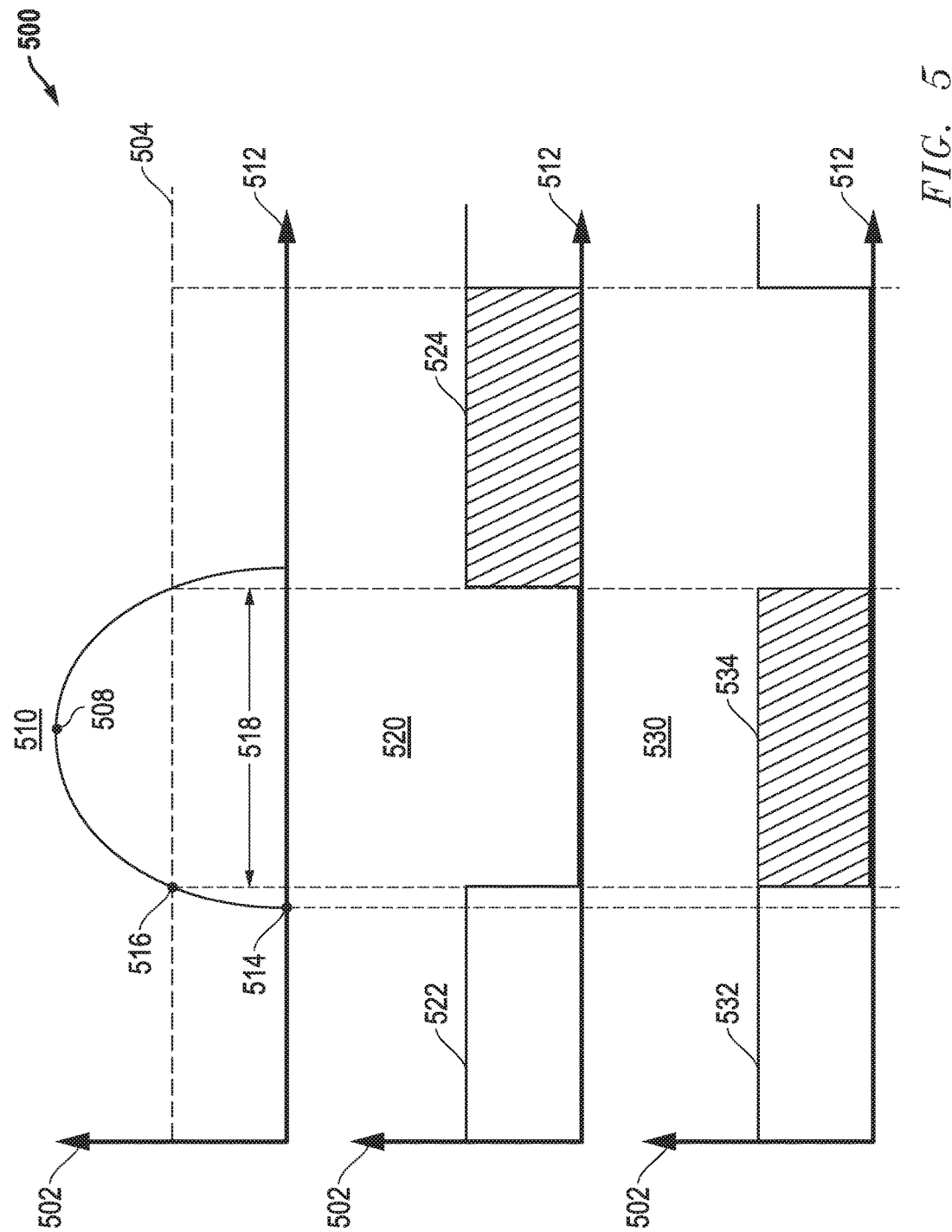
FIG. 5 illustrates a timing diagram for reporting time of flight with a fixed delay over a real time communication bus according to an embodiment.

FIG. 5 illustrates timing diagram 500. Timing diagram 500 includes a pulse signal 510, an input/output (I/O) line communication 520, and an I/O line communication 530. Pulse signal 510, situated on a y-axis 502 and an x-axis 512 includes a peak detection 508, a threshold 504, a time of flight 514, a first detection 516, and a detection time 518. I/O line communication 520 includes y-axis 502, x-axis 512, signal 522, and a post detection fixed delay 524. I/O line communication 530 includes y-axis 502, x-axis 512, signal 532, and a Q factor time delay 534.

Within timing diagram 500, pulse signal 510 is received at transducer 214 when a transmitted acoustic signal encounters and obstacle. The magnitude of pulse signal 510 is reported on y-axis 502. The time span of the pulse signal measurement is reported on the y-axis. Threshold 504 represents a sufficient magnitude to detect the presence of an obstacle. At first detection 516 the magnitude of the received pulse intersects threshold 504. Peak detection 508 is the maximum detected point of the obstacle, above threshold 504. Obstacle detection is active while pulse signal 510 is above threshold 504.

I/O line communication 520 illustrates how pulse signal 510 is communicated via the I/O line when a post measurement fixed delay is applied. For example, when pulse signal intersects threshold 504, pulse signal 510 crosses the threshold at first detection 516 and is reported via the I/O line to controller 204 as signal 522 having a falling edge. The low pulse identifies the width of pulse signal 510, which corresponds to detection time 518. The I/O line rising edge, illustrated as fixed delay 524, identifies when pulse signal 510 drops below threshold 504, thereby corresponding to when to initiate a lag time for reporting the time of flight to controller 204.

As an alternative to this post measurement fixed delay, sensing circuit 300 factors into the algorithm of the corrected time of flight, a Q factor fixed delay, during the receipt of the pulse signal 510. IO line communication 530 illustrates how pulse signal 510 is communicated via the IO line when a Q factor fixed delay is associated with sensing circuit 300. For example, pulse signal 510 is represented by signal 532 as a falling edge when pulse signal 510 falls below threshold 510. The falling edge of signal 532 corresponds with the completion of detection time 518. Q factor delay 534 is factored into detection time 518; therefore, an additional delay, such as fixed delay 524, is avoided.

To further explain the incorporation of Q factor time delay into detection time 518, in one example, the Q factor time delay 534 is determined when a pulse signal 516 intersects threshold 504. Pulse signal 510 is received at transducer 214. In response to receiving first detection 516, the duration of Q factor time delay 534 is determined. Q factor time delay 534 determines a maximum time to receive transmission of pulse signal 510 before time of flight measurement 514 is provided to controller 205. Sensing circuit 330 determines when Q factor time delay 534 is greater than detection time 518. In response to Q factor time delay 534 being less than detection time 518, Q factor time delay is dynamically increased, thereby increasing the response time of the associated component, such as digital filter 322 and transducer 214. In response to Q factor time delay 534 being greater than detection time 518 a corrected Q factor time delay is provided. In one embodiment, a predetermined fixed time delay is utilized corresponding to a maximum Q factor of at least one of digital filer 322 and transducer 214.

Figure 6:
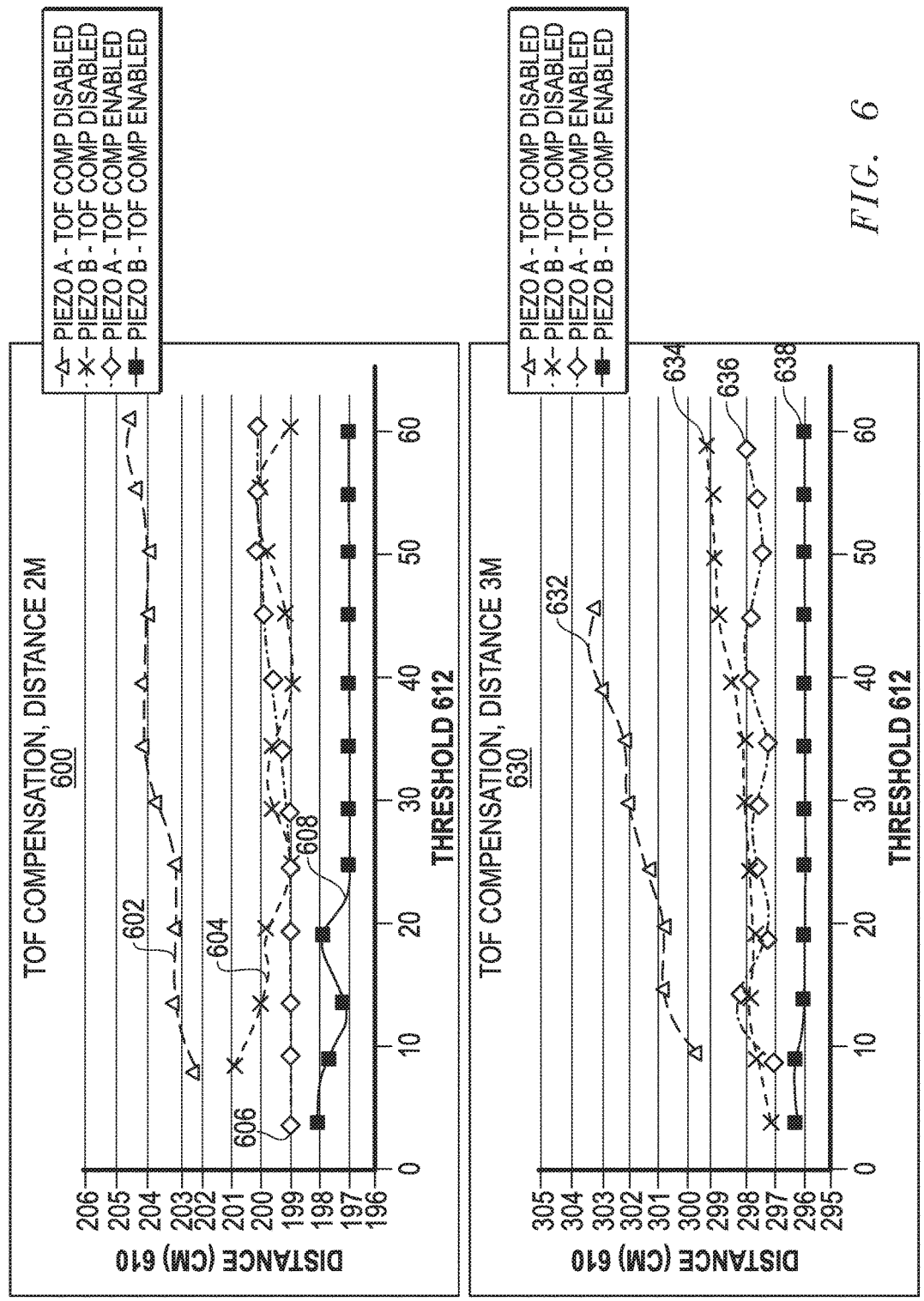
FIG. 6 illustrates graphs showing the effects of a distance varying threshold when an object is detected at a first and second distance relative to the acoustic sensor of FIG. 1.

FIG. 6 illustrates a chart depicting the effects of a distance varying threshold when an object is detected at a first and second distance relative to an acoustic sensor. Time of flight compensation chart 600 includes distance 610, threshold 612, piezo A disabled 602, piezo B disabled 604, piezo A enabled 606, and piezo B enabled 608. Time of flight compensation chart 630 includes distance 610, threshold 612, piezo A disabled 632, piezo B disabled 634, piezo A enabled 636, and piezo B enabled 638.

Time of flight compensation chart 600 illustrates a sensor, for example, an amplitude modulated sensor and frequency chirp sensor, that receive an echo signal when an obstacle is encountered at a distance of two meters, during a time of flight measurement. Within time of flight compensation chart 600 distance 610 is the measured distance of the obstacle in centimeters, threshold 612 corresponds to the variance in the magnitude of the threshold reported, piezo A disabled 602 corresponds to a piezo electronic device, for example frequency chirp sensor, in which the time of flight compensation is disabled. Likewise, piezo B disabled 604 corresponds to a piezo electronic device, for example, amplitude modulation sensor, in which the time of flight compensation is also disabled. Similarly, piezo A enabled 606 and piezo B enabled 608 correspond to frequency chirp sensors and amplitude modulation sensors, respectively, in which the time of flight compensation is enabled.

In the example of time of flight compensation chart 600, piezo A disabled 602 and piezo B disabled 604 simulate a variance of nearly three centimeters when the predetermined threshold varies from 10 to 60 with respect to the magnitude of threshold 612. Contrastingly, for piezo A enabled 606 and piezo B enabled 608 a negligible variance of one centimeter is identified when the predetermined threshold varies from 10 to 60 with respect to the magnitude of threshold 612. Enabling time of flight compensation increases the accuracy of the measurement by at least two centimeters. Further, the enabling of time of flight compensation illustrates the time of flight is not largely affected by the predetermined threshold when time of flight compensation is enabled.

Time of flight compensation chart 630 illustrates a sensor, for example an amplitude modulated sensor and frequency chirp sensor, that receive an echo signal when an obstacle is encountered at a distance of three meters, during a time of flight measurement. Within time of flight compensation chart 630 distance 610 is the measured distance of the obstacle in centimeters, threshold 612 corresponds to the variance in the magnitude of the threshold reported, piezo A disabled 632 corresponds to a piezo electronic device, for example frequency chirp sensor, in which the time of flight compensation is disabled. Likewise, piezo B disabled 634 corresponds to a piezo electronic device, for example, amplitude modulation sensor, in which the time of flight compensation is also disabled. Similarly, piezo A enabled 636 and piezo B enabled 638 correspond to frequency chirp sensors and amplitude modulation sensors, respectively, in which the time of flight compensation is enabled.

In the example of time of flight compensation chart 630, piezo A disabled 632 and piezo B disabled 634 simulate a variance of nearly two to three centimeters when the predetermined threshold varies from 10 to 60 with respect to the magnitude of threshold 612. Contrastingly, for piezo A enabled 636 and piezo B enabled 638, a negligible variance of one centimeter or less is identified when the predetermined threshold varies from 10 to 60 with respect to the magnitude of threshold 612. With an increase in distance between the sensor and detectable object, enabling time of flight compensation increases the accuracy of the measurement by at least two centimeters. Further, once again the enabling of time of flight compensation illustrates the time of flight is not affected by the predetermined threshold when time of flight compensation is enabled.

Figure 7:
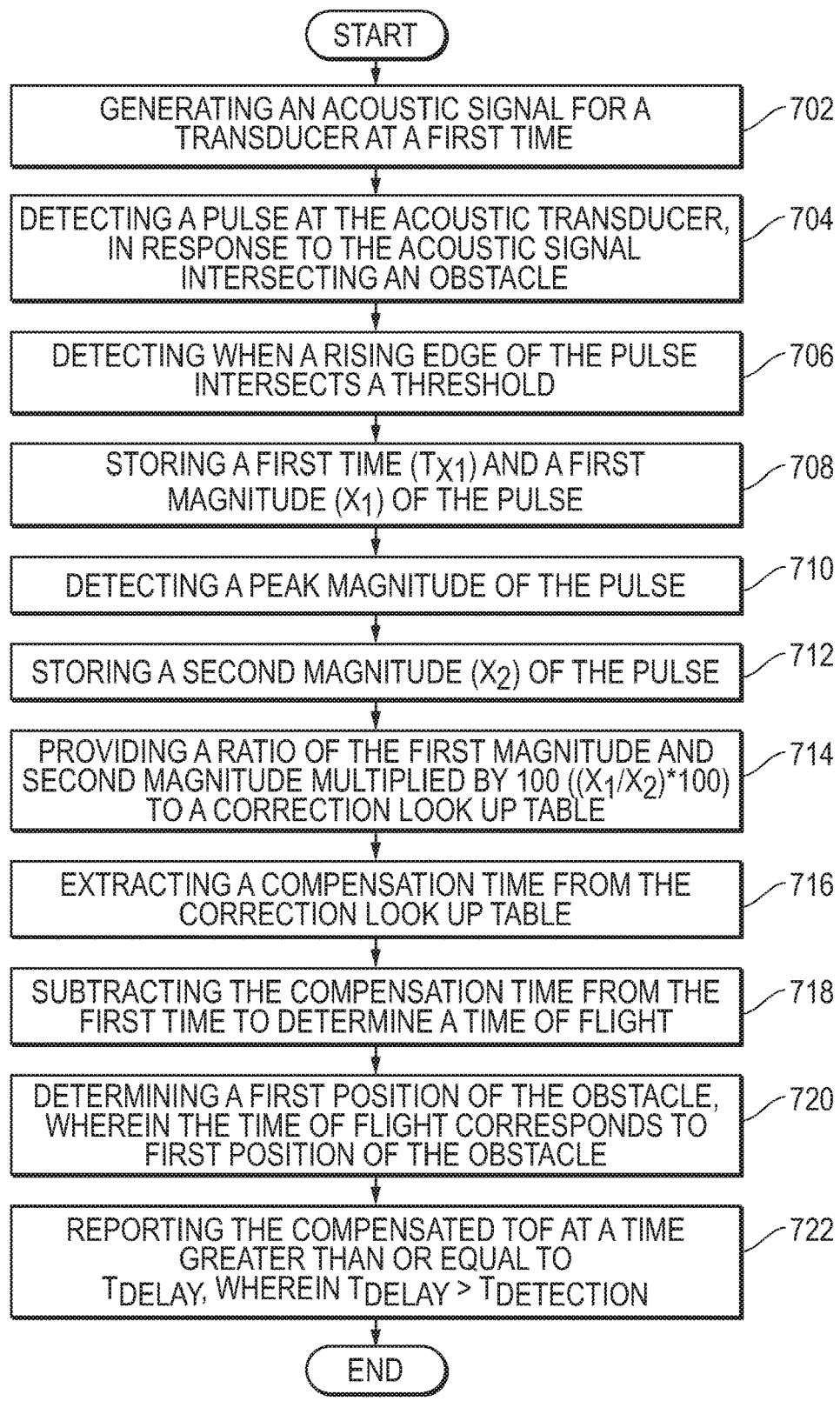
FIG. 7 illustrates a flow diagram of a method for reporting the compensated time of flight of a detected obstacle according to an embodiment.

FIG. 7 illustrates a flow diagram of method 700 for detecting an obstacle with time of flight compensation enabled. At block 702 an acoustic signal for an acoustic transducer at a first time is generated. A pulse is detected at the acoustic transducer, in response to the acoustic signal encountering an obstacle at block 704. At block 706, when the rising edge of the pulse intersects a threshold is detected. The first time and the first magnitude of the pulse at the intersected point are stored at block 908. At block 710, the peak magnitude of the received pulse is detected. The peak magnitude is stored as the second magnitude of the received pulse, at block 712. At block 714, a ratio of the first magnitude and the second magnitude, multiplied by 100, are provided to a correction look up table. A compensation time is extracted from the correction look up table at block 716. The compensation time is subtracted from the first time, at block 718, to determine a compensated time of flight. At block 720 the first position of the obstacle is determined since the compensated time of flight corresponds to the first position of the obstacle. The compensated time of flight is reported to the controller, at block 722, at a time equivalent to less than the Q factor time delay. The process concludes at the end block.

While the subject matter is described with specific preferred embodiments and example embodiments, the foregoing drawings and descriptions thereof depict only typical embodiments of the subject matter and are not therefore to be considered as limiting of its scope, and many alternatives and variations will be apparent to those skilled in the art. Inventive aspects of the present disclosure may lie in less than all features of a single foregoing disclosed embodiment.

Furthermore, some embodiments described herein include some but not other features included in other embodiments, and therefore combinations of features of different embodiments are meant to be within the scope of the disclosure, and form different embodiments, as would be understood by those skilled in the art.

What is claimed is:

1. An acoustic distance measuring circuit, comprising:
  a transmitter amplifier having an output adapted to be coupled to an acoustic transducer that provides an acoustic signal thereto and that provides an acoustic transducer quality factor time delay;
  a receiver amplifier having an input adapted to be coupled to the acoustic transducer that receives a pulse, and an output;
  a controller that provides a threshold that defines a time varying magnitude signal in response to a dimensional position of the acoustic transducer and in response to a measured effect of background noise detected by the acoustic transducer; and
  a sensing circuit having an input coupled to the output of the receiver amplifier, and an output that provides a corrected time of flight measurement in response to detection of the threshold, that defines a time for the acoustic signal to travel to a first position of an obstacle in response to transmission of the acoustic signal from the acoustic transducer, and that detects the obstacle within a predefined distance relative to the acoustic transducer, wherein the sensing circuit determines a first time when the pulse crosses a first threshold, a peak of the pulse, a correction ratio of the first threshold to the peak of the pulse, a compensation time corresponding to the correction ratio, and an adjusted time of flight in response to a difference of the first time and the compensation time.

2. The acoustic distance measuring circuit of claim 1, wherein the sensing circuit comprises:
  a digital filter having an input coupled to the output of the receiver amplifier, an output that provides a filtered signal, and an output that provides a digital filter quality factor time delay;
  a rising edge detector having an input coupled to the output of the digital filter, and an output that provides a first magnitude and the first time of when a rising edge of the pulse received from the receiver amplifier intersects the threshold; and
  a peak detector having an input coupled to the output of the digital filter, and an output that provides a magnitude of the pulse received from the receiver amplifier at a peak time, in response to detecting the obstacle within the predefined distance relative to the acoustic transducer according to the filtered signal.

3. The acoustic distance measuring circuit of claim 2, wherein the sensing circuit comprises:
  a first correction module having an input coupled to the rising edge detector and the peak detector, and an output that provides the correction ratio, wherein the correction ratio is a ratio of the first magnitude of when the rising edge of the pulse received from the receiver amplifier intersects the threshold and the magnitude of the pulse received from the acoustic transducer at the peak time; and
  a time of flight correction calculation module having an input coupled to the output of the first correction module, an input that receives the digital filter quality factor time delay, an input that receives the acoustic transducer quality factor time delay, and an output that provides the compensation time and that calculates a corrected time of flight of the acoustic signal in response to encountering the obstacle, at the first position, within the predefined distance relative to the acoustic transducer according to the filtered signal.

4. The acoustic distance measuring circuit of claim 3, wherein the sensing circuit further comprises a time of flight module having an input coupled to an output of the peak detector, an input coupled to the output of the time of flight correction calculation module, and an output that provides the corrected time of flight of the acoustic signal in response to the acoustic signal encountering the obstacle.

5. The acoustic distance measuring circuit of claim 4, wherein the first correction module further multiplies the ratio by a factor of one hundred.

6. The acoustic distance measuring circuit of claim 4, wherein the time of flight module provides the corrected time of flight when the compensation time, provided by the output of the time of flight correction calculation module, is subtracted from the first time of when the rising edge of the magnitude of the pulse received from the receiver amplifier intersects the threshold.

7. The acoustic distance measuring circuit of claim 4, wherein the digital filter quality factor time delay is dynamically selected when the magnitude of the pulse is detected.

8. The acoustic distance measuring circuit of claim 4, wherein the digital filter quality factor time delay dynamically determines a delay time of the sensing circuit.

9. The acoustic distance measuring circuit of claim 8, wherein in response to detection of the digital filter quality factor time delay below a predetermined quality factor time delay, a transducer quality factor time delay is dynamically input when the magnitude of the pulse is detected.

10. The acoustic distance measuring circuit of claim 8, wherein as an increase in the digital filter quality factor time delay is detected, a response time of the digital filter automatically increases.

11. An acoustic distance measuring system, comprising:
a transmitter amplifier that provides an acoustic signal thereto and that provides an acoustic transducer quality factor time delay;
a receiver amplifier that receives a pulse;
a controller that provides a threshold that defines a time varying magnitude signal in response to a dimensional position of an acoustic transducer and in response to a measured effect of background noise detected by the acoustic transducer;
a sensing circuit that provides a corrected time of flight measurement in response to detection of the threshold, for defining a time for the acoustic signal to travel to a first position of an obstacle in response to transmission of the acoustic signal from the acoustic transducer, and that detects the obstacle within a predefined distance relative to the acoustic transducer;
a digital filter that provides a filtered signal, and a digital filter quality factor time delay;
a rising edge detector that provides a first magnitude and a first time of when a rising edge of the pulse received from the receiver amplifier intersects the threshold;
a peak detector that provides a second magnitude of the pulse received from the receiver amplifier at a peak time, in response to detecting the obstacle within the predefined distance relative to the acoustic transducer according to the filtered signal;
a first correction module for providing a correction ratio as a ratio of the first magnitude to the second magnitude;
a time of flight correction calculation module that provides a compensation time corresponding to the correction ratio; and
a time of flight module that provides a corrected time of flight of the acoustic signal as a difference between the first time and the compensation time.

12. An acoustic distance measuring circuit, comprising:
an acoustic signal generating circuit that provides an electrical pulse signal and having an output adapted to be coupled to an acoustic transducer; and
a receiving circuit having a first input adapted to be coupled to the acoustic transducer, a second input that receives a threshold, and an output that provides a corrected time of flight measurement, wherein the receiving circuit detects a time of flight in response to a received signal crossing the threshold, and adjusts the time of flight according to a ratio of the threshold to a peak of the received signal.

13. The acoustic distance measuring circuit of claim 12, further comprising:
a controller having an output coupled to the second input of the receiving circuit that provides the threshold in response to a dimensional position of the acoustic transducer and in response to a measured effect of background noise detected by the acoustic transducer.

14. The acoustic distance measuring circuit of claim 13, wherein the acoustic signal generating circuit comprises:
a frequency generator having an input coupled to the controller, and an output that provides a pulse signal; and
a transmitter amplifier having an input coupled to the output of the frequency generator, and an output adapted to be coupled to the acoustic transducer that provides the electrical pulse signal.

15. The acoustic distance measuring circuit of claim 12, wherein the receiving circuit comprises:
a receiver amplifier having an input adapted to be coupled to the acoustic transducer, and an output; and
a sensing circuit having a first input coupled to the output of the receiver amplifier, a second input that receives the threshold, and an output that provides the corrected time of flight measurement.

16. The acoustic distance measuring circuit of claim 15, wherein the receiving circuit further comprises:
a digital filter having an input coupled to the output of the receiver amplifier, an output that provides a filtered signal, and an output that provides a digital filter quality factor time delay;
a rising edge detector having an input coupled to the output of the digital filter, and an output that provides a first magnitude and a first time of when a rising edge of a pulse received from the receiver amplifier intersects the threshold; and
a peak detector having an input coupled to the output of the digital filter, and an output that provides a magnitude of the pulse received from the receiver amplifier at a peak time, in response to detecting an obstacle within a predefined distance relative to the acoustic transducer according to the filtered signal.

17. The acoustic distance measuring circuit of claim 16, wherein the sensing circuit further comprises:
a first correction module having an input coupled to the rising edge detector and the peak detector, and an output that provides a correction ratio, wherein the correction ratio is a ratio of the first magnitude of when the rising edge of the pulse received from the receiver amplifier intersects the threshold and the magnitude of the pulse received from the receiver amplifier at the peak time; and a time of flight correction calculation module having an input coupled to the output of the first correction module, an input that receives the digital filter quality factor time delay, an input that receives an acoustic transducer quality factor time delay, and an output that provides a compensation time that calculates a corrected time of flight of the acoustic signal in response to encountering the obstacle, at a first position, within the predefined distance relative to the acoustic transducer according to the filtered signal.

18. The acoustic distance measuring circuit of claim 17, wherein the sensing circuit further comprises a time of flight module having an input coupled to an output of the peak detector, an input coupled to the output of the time of flight correction calculation module, and an output that provides the corrected time of flight of the acoustic signal in response to the acoustic signal encountering the obstacle.

19. The acoustic distance measuring circuit of claim 18, wherein the time of flight module provides the corrected time of flight when the compensation time, provided by the output of the time of flight correction calculation module, is subtracted from the first time of when the rising edge of the magnitude of the pulse received from the receiver amplifier intersects the threshold.

20. The acoustic distance measuring circuit of claim 18, wherein the digital filter quality factor time delay is dynamically selected when the magnitude of the pulse received from the receiver amplifier is detected.

21. The acoustic distance measuring circuit of claim 18, wherein the digital filter quality factor time delay dynamically determines a delay time of the sensing circuit.

22. The acoustic distance measuring circuit of claim 21, wherein in response to detection of the digital filter quality factor time delay below a predetermined quality factor time delay, a transducer quality factor time delay is dynamically input when the magnitude of the pulse received from the receiver amplifier is detected.

\* \* \* \* \*